United States Patent
Schemmann

(10) Patent No.: US 10,149,018 B2
(45) Date of Patent: Dec. 4, 2018

(54) R-CCAP WITH AM STAR ARCHITECTURE

(71) Applicant: ARRIS Enterprises, Inc., Suwanee, GA (US)

(72) Inventor: Marcel F. Schemmann, Maria Hoop (NL)

(73) Assignee: ARRIS Enterprises LLC, Suwanee, GA (US)

( * ) Notice: Subject to any disclaimer, the term of this patent is extended or adjusted under 35 U.S.C. 154(b) by 209 days.

(21) Appl. No.: 14/462,985

(22) Filed: Aug. 19, 2014

(65) Prior Publication Data

US 2015/0052572 A1    Feb. 19, 2015

Related U.S. Application Data

(60) Provisional application No. 61/867,550, filed on Aug. 19, 2013, provisional application No. 61/867,540, filed on Aug. 19, 2013, provisional application No. 61/867,549, filed on Aug. 19, 2013.

(51) Int. Cl.
| | |
|---|---|
| *H04N 21/61* | (2011.01) |
| *H04N 21/234* | (2011.01) |
| *H04B 10/2575* | (2013.01) |
| *H04L 12/28* | (2006.01) |

(52) U.S. Cl.
CPC ........ *H04N 21/61* (2013.01); *H04B 10/25751* (2013.01); *H04L 12/2801* (2013.01); *H04N 21/234* (2013.01); *H04N 21/6118* (2013.01); *H04N 21/6168* (2013.01)

(58) Field of Classification Search
CPC .............................. H04N 21/61; H04N 21/234
See application file for complete search history.

(56) References Cited

U.S. PATENT DOCUMENTS

| | | | |
|---|---|---|---|
| 5,436,902 A | * | 7/1995 | McNamara ......... H04L 12/4604 |
| | | | 370/401 |
| 5,915,205 A | | 6/1999 | Chen |
| 6,490,727 B1 | | 12/2002 | Nazarathy et al. |

(Continued)

FOREIGN PATENT DOCUMENTS

| | | | | |
|---|---|---|---|---|
| EP | 0831619 A2 | | 3/1998 | |
| EP | 1128585 A2 | * | 8/2001 | ............. H04J 14/02 |

(Continued)

OTHER PUBLICATIONS

Cutts, David J., "DVB Conditional Access", Electronics & Communication Engineering Journal, Feb. 1997.*

(Continued)

*Primary Examiner* — Brian T Pendelton
*Assistant Examiner* — Krista A Contino Saumby
(74) *Attorney, Agent, or Firm* — Lori Anne D. Swanson

(57) ABSTRACT

A remote node system with an amplitude modulation (AM) star architecture is formed between a remote node and a plurality of field nodes split from the remote CCAP node. In embodiments, an R-CCAP node can be combined with amplitude modulation (AM) optics in a star architecture for building low power nodes, supporting set top box (STB) out of band (OOB) signals, and increasing system bandwidth (BW). The remote node can be implemented in media content delivery networks, such as a hybrid fiber-coax HFC network or evolving radio frequency over glass (RFoG) networks.

20 Claims, 9 Drawing Sheets

(56) References Cited

U.S. PATENT DOCUMENTS

| | | | |
|---|---|---|---|
| 6,910,074 B1* | 6/2005 | Amin | H04L 12/2856 709/227 |
| 7,146,630 B2* | 12/2006 | Dravida | H04L 12/2801 348/E7.049 |
| 7,388,435 B2* | 6/2008 | Neenan | H03F 1/08 250/214 A |
| 7,596,801 B2* | 9/2009 | Wall | H04H 20/69 370/206 |
| 8,650,606 B2* | 2/2014 | Nielsen | H04B 3/50 370/241 |
| 9,191,064 B2 | 11/2015 | Schemmann et al. | |
| 2002/0075830 A1* | 6/2002 | Hartman, Jr. | 370/333 |
| 2003/0223460 A1 | 12/2003 | Smith et al. | |
| 2006/0045542 A1* | 3/2006 | Lee et al. | 398/195 |
| 2009/0049492 A1 | 2/2009 | Pantelias | |
| 2010/0232785 A1* | 9/2010 | Gazier | H04B 10/2575 398/8 |
| 2011/0008042 A1* | 1/2011 | Stewart | 398/42 |
| 2011/0181312 A1* | 7/2011 | Ouslis et al. | 324/750.3 |
| 2012/0020616 A1* | 1/2012 | Babie | H04J 14/02 385/27 |
| 2013/0070640 A1 | 3/2013 | Chapman | |
| 2013/0094806 A1* | 4/2013 | Lessard | H04B 10/2581 385/28 |
| 2013/0125194 A1 | 5/2013 | Finkelstein et al. | |
| 2014/0101711 A1* | 4/2014 | Rakib | H04N 21/6118 725/129 |
| 2014/0335897 A1* | 11/2014 | Clem | G08G 1/0112 455/456.3 |
| 2015/0052573 A1 | 2/2015 | Schemmann et al. | |

FOREIGN PATENT DOCUMENTS

| | | |
|---|---|---|
| EP | 1394990 A1 | 3/2004 |
| EP | 1394991 A1 | 3/2004 |

OTHER PUBLICATIONS

Computer Desktop Encyclopedia, "Node", (http://lookup.computerlanguage.com/host_app/search?cid=C999999&term=node&lookup.x=0&lookup.y=0).*

TechTarget, "Node", (http://searchnetworking.techtarget.com/definition/node).*

Computer Hope, "Node", (http://www.computerhope.com/jargon/n/node.htm).*

PCT Search Report & Written Opinion, Re: Application No. PCT/US2014/051655, dated Dec. 23, 2014.

"Digital Broadband Delivery System: Out of Band Transport Part 1: Mode A", Society of Telecommunications Engineers, Engineering Committee, Digital Video Subcommittee, American National Standard, ANSI/SCTE 55-1 2009, 51 pgs.

"Digital Broadband Delivery System: Out of Band Transport Part 2: Mode B", Society of Telecommunications Engineers, Engineering Committee, Digital Video Subcommittee, American National Standard, ANSI/SCTE 55-2 2008, 70 pgs.

* cited by examiner

R-CCAP WITH AM STAR ARCHITECTURE

CROSS-REFERENCES TO RELATED APPLICATIONS

The present disclosure claims priority to U.S. Provisional App. No. 61/867,549, entitled "R-CCAP with AM Star Architecture" filed Aug. 19, 2013, to U.S. Provisional App. No. 61,867,540, entitled "Bidirectional Communication in a Cable Television Return" filed Aug. 19, 2013, and to U.S. Provisional App. No. 61/867,550 entitled "Fiber-Optic Node with Forward Data Content Driven Power Consumption, filed Aug. 19, 2013, the contents of all of which are incorporated herein by reference in its entirety.

BACKGROUND

A cable television (CATV) system may provide media content, such as video, data, voice, or high-speed Internet services, for example, to subscribers. The cable television system may deliver the media content from a headend to subscriber's client devices over an existing cable television network. The cable television network can take the form of an all-coax, all-fiber, or hybrid fiber/coax (HFC) network. Growth data requirements in CATV networks are growing exponentially. It is important to continue the analysis of the various network elements that can enhance or inhibit the overall performance of next generation cable networks.

A Converged Cable Access Platform, e.g., R-CCAP, has been proposed as an architecture that can work with maximum transparency. However R-CCAP becomes expensive for node splits. Thus, a more efficient implementation of R-CCAP in to the cable network is desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It should be understood that, while the accompanying figures illustrate embodiments that include the portions of the disclosure claimed, and explain various principles and advantages of those embodiments, the details displayed are not necessary to understand the illustrated embodiments, as the details depicted in the figures would be readily apparent to those of ordinary skill in the art having the benefit of the present disclosure.

DETAILED DESCRIPTION

Disclosed herein are techniques for a remote Converged Cable Access Platform (R-CCAP) with an amplitude modulation (AM) star architecture. In embodiments, an R-CCAP node can be combined with AM optics in a star architecture for building low power nodes, supporting set top box (STB) out of band (OOB) signals, and increasing system bandwidth (BW). The R-CCAP node can be implemented in media content delivery networks, such as an HFC network or the evolving radio frequency over glass (RFoG) networks.

Figure 1:
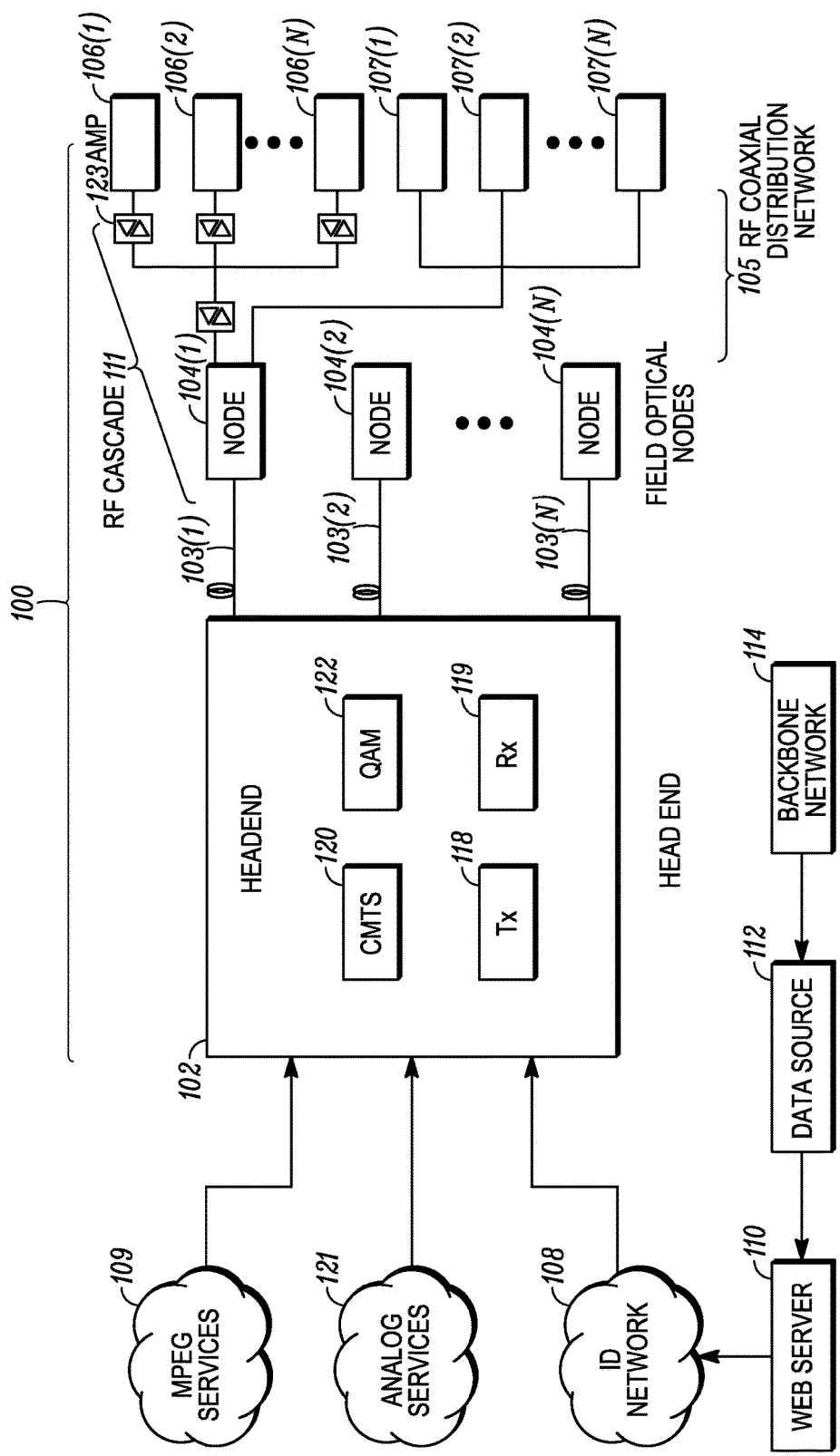
FIG. 1 illustrates an example CATV system.

FIG. 1 illustrates an example cable television (CATV) system 100 operable to deliver high-definition digital entertainment and telecommunications such as video, voice, and high-speed Internet services. Generally speaking, the CATV system 100 refers to the operational (e.g., geographical) footprint of an entertainment and/or information services franchise that provides entertainment and/or information services to a subscriber base spanning one or more towns, a region, or a portion thereof. Particular entertainment and/or information services offered by the franchise (e.g., entertainment channel lineup, data packages, etc.) may differ from system to system. Some large cable companies operate several cable communication systems (e.g., in some cases up to hundreds of systems), and are known generally as Multiple System Operators (MSOs).

The cable network can take the form of an all-coax, all-fiber, or hybrid fiber/coax (HFC) network, e.g., fiber to the last amplifier (FTTA). For purposes of illustration only, FIG. 1 depicts a hybrid fiber-coaxial (HFC) network. An HFC network is a broadband network that combines optical fiber and coaxial cable, strategically placing fiber nodes to provide services to a plurality of homes. It should be understood that the systems and methods disclosed in the present application may be employed in various networks and the HFC network is merely shown as a non-limiting example.

The network shown in FIG. 1 is an HFC broadband network that combines the use of optical fiber and coaxial connections. The network includes a headend 102 that receives analog video signals and digital bit streams representing different services (e.g., video, voice, and Internet) from various digital information sources. For example, the headend 102 may receive content from one or more video on demand (VOD) servers, IPTV broadcast video servers, Internet video sources, or other suitable sources for providing IP content.

FIG. 1 includes an IP network 108, MPEG services 109, and analog services 111. The IP network 108 includes web server 110 and a data source 112. The web server 110 is a streaming server that uses the IP protocol to deliver video-on-demand, audio-on-demand, and pay-per view streams to the IP network 108. The IP data source 112 may be connected to a regional area or backbone network (not shown) that transmits IP content. For example, the regional area network can be or include the Internet or an IP-based network, a computer network, a web-based network or other suitable wired or wireless network or network system.

At the headend 102, the various services are encoded, modulated and up-converted onto radio frequency (RF) carriers, combined onto a single electrical signal and inserted into a broadband optical transmitter (Tx) 118. A fiber optic network 103 extends from the cable operator's master/regional headend 102 to a plurality of fiber optic nodes 104(1) . . . 104(n). The headend 102 may contain an optical transceiver (transmitter 118 and optical receiver (Rx)

119) to send and receive optical communications through the optical fibers 103. Regional headends and/or neighborhood hub sites may also exist between the headend and one or more nodes. The fiber optic portion 103 of the example HFC network extends from the headend to the regional headend/hub and/or to a plurality of nodes 104(1)-(n). The optical transmitter 118 converts the electrical signal to a downstream optically modulated signal that is sent to the nodes 104. In turn, the optical nodes 104 convert inbound signals to RF energy for network elements 106. In the return path, optical nodes 104 convert return RF signals to optical signals, and send the optical signals through optical network 103 to receiver 119, which can convert the optical signals back to electrical signals. In one example, a node 104 is a local digital hub that transports local requests over the optical network and back to the customer home via the coaxial cables.

In the specification, the drawings, and the claims, the terms "forward path" and "downstream" may be interchangeably used to refer to a path from a headend to a node, a node to a subscriber, or a headend to a subscriber. Conversely, the terms "return path", "reverse path" and "upstream" may be interchangeably used to refer to a path from a subscriber to a node, a node to a headend, or a subscriber to a headend. Also, in the specification, in the drawings, and the claims a node may be any analog or digital hub between a headend and a customer home that transports local requests over the CATV network. Forward path optical communications over the optical fiber may be converted at the nodes to Radio Frequency (RF) communications for transmission over the coaxial cable to the subscribers. Conversely, return path RF communications from the subscribers are provided over coaxial cables and are typically converted at a node to optical signals for transmission over the optical fiber to the headend. Each node 104 may contain a return path transmitter that is able to relay communications upstream from a subscriber device 106 to the headend 102.

Each node 104a-n serves a service group made up of one or more customer locations. By way of example, a single node 104(1) may be connected to thousands of cable modems or other network elements 106 including bidirectional RF amplifiers. In an example, a fiber node 104 serves anywhere from 1 to 2000 customer locations. In an HFC network, the fiber optic node 104 may be connected to a plurality of client devices 106 via a coaxial cable portion 105 or a combined fiber optic/coaxial cable portion 105 of the network. In implementations, each node 104 may include a broadband optical receiver to convert the downstream optically modulated signal received from the headend/hub to an electrical signal provided to the subscribers' network elements 106(1) . . . 106(n) via a coaxial portion 105 of the HFC network. Each node 106 may be connected to many network elements 102 of subscribers via a coaxial cable portion of the network represented by the RF cascade 111. Signals may pass from the node 104 to the client devices 106, 107 via the RF cascade 111, which may be comprised of multiple amplifiers 123 and active or passive devices including cabling, taps, splitters, and in-line equalizers. In examples, client devices 106 may be connected via amplifiers 123, and client devices 107 do not have signals amplified in network 105. The tap is the customer's drop interface to the coaxial system. Taps are designed in various values to allow amplitude consistency along the distribution system.

The subscriber devices 106 may reside at a customer location, such as a home of a cable subscriber, and are connected to the cable modem termination system (CMTS) 120 or comparable component located in a headend. A client device 106 may be a modem, e.g., cable modem, MTA (media terminal adaptor), set top box, terminal device, television equipped with set top box, Data Over Cable Service Interface Specification (DOCSIS) terminal device, customer premises equipment (CPE), router, or like electronic client, end, or terminal devices of subscribers. For example, cable modems and IP set top boxes may support data connection to the Internet and other computer networks via the cable network, and the cable network provides bi-directional communication systems in which data can be sent downstream from the headend 102 to a subscriber and upstream from a subscriber to the headend 102.

The techniques disclosed herein may be applied to systems compliant with DOCSIS. The cable industry developed the international Data Over Cable System Interface Specification (DOCSIS®) standard or protocol to enable the delivery of IP data packets over cable systems. In general, DOCSIS defines the communications and operations support interface requirements for a data over cable system. For example, DOCIS defines the interface requirements for cable modems involved in high-speed data distribution over cable television system networks. However, it should be understood that the techniques disclosed herein may apply to any system for digital services transmission, such as digital video or Ethernet PON over Coax (EPoc). Examples herein referring to DOCSIS are illustrative and representative of the application of the techniques to a broad range of services carried over coax.

References are made in the present disclosure to a Cable Modem Termination System (CMTS) in the headend 102. In general, the CMTS is a component located at the headend or hub site of the network that exchanges signals between the headend and client devices within the cable network infrastructure. In an example DOCSIS arrangement, for example, the CMTS and the cable modem may be the endpoints of the DOCSIS protocol, with the hybrid fiber coax (HFC) cable plant transmitting information between these endpoints. It will be appreciated that system 100 includes one CMTS for illustration clarity only—indeed, it is customary that multiple CMTS's and their CMs are managed through the management network.

The CMTS 120 hosts downstream and upstream ports and contains numerous receivers, each receiver handling communications between hundreds of end user network elements connected to the broadband network. For example, each CMTS 120 receiver may be connected to several modems of many subscribers, e.g., a single receiver may be connected to hundreds of modems which vary widely in communication characteristics. In many instances several nodes, such as fiber optic nodes 104(1), may serve a particular area of a town or city. DOCSIS enables IP packets to pass between devices on either side of the link between the CMTS and the cable modem.

Traffic transferred from the headend 102 to a receiving device 106(1) . . . 106(n) can be said to travel in a downstream direction; conversely, traffic transferred from a receiving device 106(1) . . . 106(n) to the headend 102 can be said to travel in an upstream direction. Downstream (also referred to as forward path) optical communications over the optical fiber 103 are typically converted at the nodes 104 to Radio Frequency (RF) communications for transmission over the coaxial cable in network 105. Conversely, upstream (also referred to as return path) RF communications from the network elements are provided over the coaxial cables in network 105 and are typically converted at nodes 104 to optical communications for transmission over the optical fiber 103 to the headend 102. Each node 104 may contain a reverse/return path transmitter that is able to relay communications upstream from a subscriber network element 106 to the headend 102.

It should be understood that the CMTS is a non-limiting example of a component in the cable network that may be used to exchange signals between the headend and subscriber devices 106 within the cable network infrastructure. For example, other non-limiting examples include a Modular CMTS (M-CMTSTM) architecture or a Converged Cable Access Platform (CCAP). The CCAP is designed to function similarly to the CMTS, but provides a more efficient handling of traffic via the use of internet protocol (IP) routing to replace significant combining, splitting, and cabling components in the CMTS. Thus, the CCAP design may improve the efficiency of the CMTS design, improving operations, headend maintenance, and equipment life cycles. The CCAP version of the CMTS may utilize less rack space in the headend and lower power consumption.

An EdgeQAM (EQAM) 122 or EQAM modulator may be in the headend or hub device for receiving packets of digital content, such as video or data, re-packetizing the digital content into an MPEG transport stream, and digitally modulating the digital transport stream onto a downstream RF carrier using Quadrature Amplitude Modulation (QAM). EdgeQAMs may be used for both digital broadcast, and DOCSIS downstream transmission. In CMTS or M-CMTS implementations, data and video QAMs may be implemented on separately managed and controlled platforms. In CCAP implementations, the CMTS and edge QAM functionality may be combined in one hardware solution, thereby combining data and video delivery.

Orthogonal frequency-division multiplexing (OFDM) may utilize smaller subcarriers (compared to QAM carriers). For example, while a conventional DOCSIS QAM carrier is 6 MHz wide, the CATV system may employ orthogonal frequency division multiplexing (OFDM) technology with OFDM carriers that are approximately 25 kHz to 50 kHz wide. Thus, where previously 100 QAM carriers were used, thousands of OFDM subcarriers may be used. OFDM technology may be suitable for noisy signal conditions and may enable use of more of the available spectrum without reducing the quality of server. In example implementations, a cable network may use the QAM modulation for downstream speeds and boost upstream speeds using OFDM.

Remote architectures may replace analog optics to eliminate RF from headends, which may overcome performance limitations of analog optics. For example, in implementations of a remote Converged Cable Access Platform (R-CCAP), the DOCSIS MAC and PHY layers are moved out of the headend and into the R-CCAP node. In some R-CCAP implementations, the entire upper and lower MAC and PHY layer functions are moved to the R-CCAP node 204, placing the CMTS, EdgeQAM and CCAP functions into the node. When the QAM is physically removed from an integrated CMTS and placed downstream it is known as an edge QAM (EQAM) or downstream PHY device. In some remote node embodiments, the remote node may be a remote physical layer (R-PHY) node, where the physical layer links a layer device (e.g., Media Access Control (MAC) layer) to a physical medium, such as an optical fiber or copper cable. In Remote PHY, the CCAP MAC remains in the cable headend Ethernet aggregation is performed in the cable headend.

Figure 2:
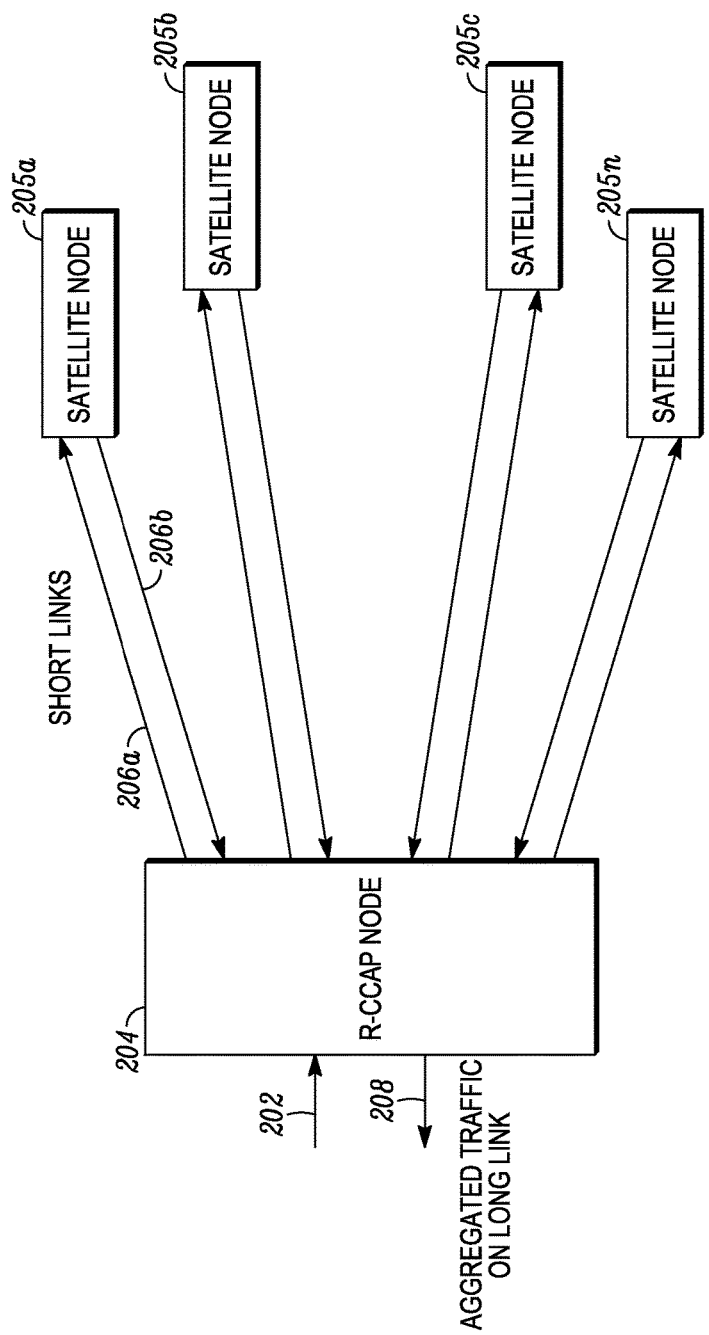
FIG. 2 depicts an embodiment of a remote Converged Cable Access Platform (R-CCAP) node splitting to a plurality of field nodes.

FIG. 2 depicts a remote (R-CCAP) node 204 and a plurality of field nodes 205*a-n*, also referred to as satellite nodes.

The disclosed architecture applies to a node remote from the headend, such as the Remote CCAP or Remote PHY nodes described, in which the RF modulation and demodulation is moved from the headend to the remote node, e.g., from a CCAP in the headend to a R-CCAP node, or from a CCAP in the headend to a R-PHY node. It should be understood that the node remote to the headend that is modified for handling modulation may be an R-CCAP node or a Remote PHY node, but it should be understood that the disclosed concepts apply to other embodiments of a remote node to which data and video processing functions from a cable headend are shifted. For example, an original node remote to the cable headend that is split may be a node to which the modulation function of the cable headend is shifted, i.e., shifting the generation of a radio frequency waveform by a digital to analog converter that receives inputs from digital signal processing.

As disclosed herein, the node to which the functionality is shifted may be linked in a star architecture to a plurality of field node. The field nodes may include nodes that are split from the original node. The field nodes are a group of nodes located in close proximity to each other and to the remote node with headend functionality, where the field nodes and the remote nodes are located together but downstream from the headend. Thus, while reference is made herein to an R-CCAP node, it should be understood that embodiments include any remote node where the modulation function is performed, such as an R-PHY node or R-CCAP variant. Accordingly, the description herein described in relation to an R-CCAP node or Remote PHY node is included by way of example, and the concepts also apply to a remote node with the CCAP functionality remoted from the headend to the remote node.

An R-CCAP node 204 offers many benefits such as retaining a transparent Ethernet layer and using a transparent RF layer as the output. Thus, instead of transparency of underlying MAC/PHY technologies in the cable network made possible because of optical technology using amplitude modulation optical technology or broadband digital, the disclosed techniques move the IP/Ethernet transport functionality past the headend/hub locations to the node. By remoting the ADC/DAC, RF MAC/PHY technologies may remain transparent. The ADCs and DACs in the R-CCAP node enable transparency of the underlying MAC/PHY technologies that travel through the R-CCAP node 2004 and use digital optics. Further, Ethernet optics could replace analog optics, for achieving higher capacity out of the fiber than with the analog optics. By delaying generating the RF signal until the R-CCAP node 204, i.e., minimizing the length the RF has to travel for delivering content to the subscriber, performance increases.

FIG. 2 depicts an R-CCAP node and a plurality of field nodes 205*a-n*. In embodiments, at least one of the plurality of field nodes is a node split from the remote node. In embodiments, a single remote node is split into a plurality of field nodes or a single node is a source node and the field nodes are split from either the single node source or from any one of the field nodes split from the single node source. Embodiments are described below in which a field node split from the remote node is placed in a geographic location in close proximity to the remote node for connection via a short-range fiber link.

The R-CCAP architecture may allow DOCSIS and existing video distribution to be combined downstream, thereby allowing network component reuse to reduce overall costs. Node splitting involves dividing subscribes connected to a single fiber node into two or more groups, such that a first group is reconnected to a single fiber node and at least a second group is reconnected to a different single fiber node. Thus, two separate fiber nodes and the associate feeds support the bandwidth for the pool of subscribers. Node splitting involves adding infrastructure so that subscribers previously served by a single node are moved to a plurality of nodes, reducing the number of subscribers per node.

Conventional cable networks, e.g., HFC networks, deliver broadband signals down fiber portions using analog based AM optics. Nonlinear optical noise distorts QAM signals as they propagate over this fiber portion of the HFC plant, the nonlinear optical noise increasing with longer fiber links. As the number of service groups (SG) served by a headend grows, the number of field nodes may accordingly increase.

As node splits proceed, an R-CCAP node 204 for each node split can become an expensive proposition. Node splits may occur at a rate that exceeds the RF port capacity of headend-based CCAPs. While providing a more modular architecture, the resulting downstream physical layer devices may require manual configuration by a network administrator for many of their operating parameters, and the R-CCAP node may not configured with an integrated upstream equivalent of the downstream capability when located in the headend. The service group size becomes so small that average traffic load is noisy, resulting in diminishing returns. Eventually, there is a point at which additional node splits do not make sense.

As disclosed herein, when a node is split, new satellite nodes, also referred to herein as field nodes, are nodes that are in close proximity to the original node and are connected over short fiber links, such as links 206a and 206b to the original node. Thus, in a local geographic location, additional nodes are split and coupled to the R-CCAP node, which is central to the split nodes in a star architecture such as that shown in FIG. 2. The links between the R-CCAP node and each satellite node may be short-range fiber links, for example, the distance between nodes may be less than 5 km long because the new nodes are installed within the service group area of the original node that is now being split.

Installation of new fiber may include any number of fiber strands between the original node, converted to a R-CCAP node 204, and the new field nodes 205a-n. Thus, a star architecture can be supported between the original node and the new field nodes 205a-n with at least one or more fiber strands for forward and return traffic. Such a short range (<5 km) star architecture permits improved performance on analog optical links such that the analog links do not limit performance and the satellite node can meet the same output specifications as the R-CCAP node and there is no need to convert these to R-CCAP nodes as well. Thus, the conversion of the original node to include R-CCAP functionality may be used to aggregate traffic from the field nodes. It is noted that multiple wavelengths may be implemented over the fiber links connecting the remote node to each of the plurality of field nodes.

Figure 3:
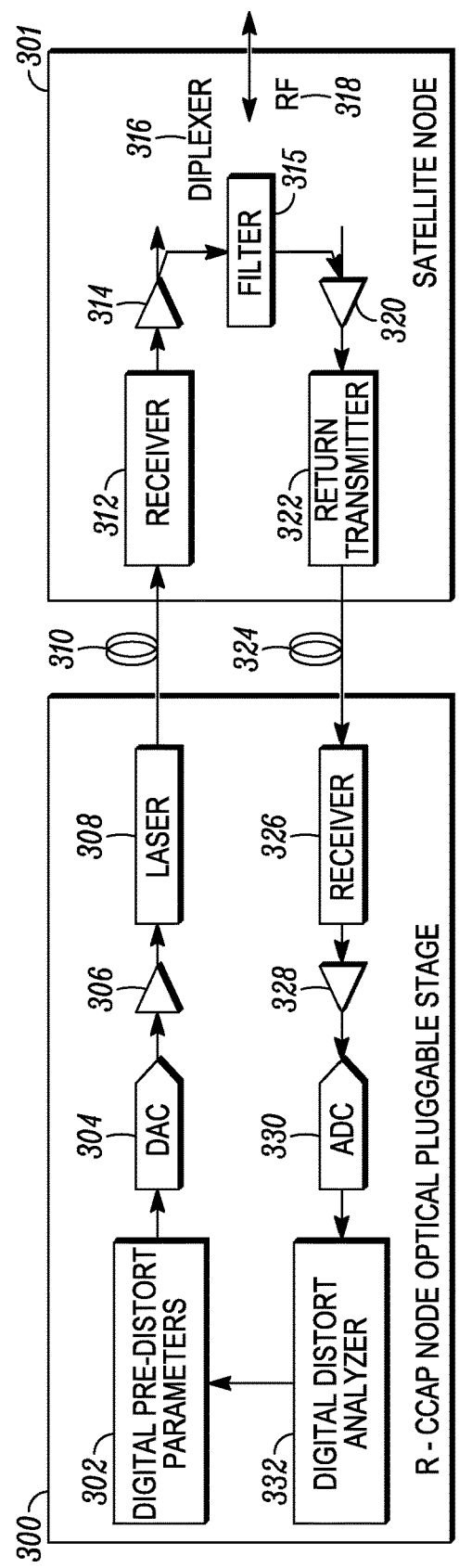
FIG. 3 depicts an embodiment for an enhanced optics operation with an R-CCAP node optical pluggable stage.

FIG. 3 depicts an enhanced optics operation with an R-CCAP node optical pluggable stage with signal pre-distortion 302, a digital to analog converter (DAC) 304, and an amplifier 306 driving a laser 308 that communicates to a receiver 312 in a field node 301 over a fiber link 310. The R-CCAP device/architecture, such as the MAC and PHY layers, may be combined in the node remote from the headend with AM optic components (e.g., the DAC 304, amplifier 306, laser 308, receiver 326), communicating over short fiber links in a star architecture with the field nodes 205a-n.

On short bidirectional optical links, e.g., 206a, 206b, the attainable SNR is very high, e.g., well above 50 dB for bandwidths approaching 2 GHz and receivers operated at +3 dBm. For short link lengths, laser power as low as +6 dBm can provide such high receiver power levels. However, in an outdoor environment laser performance is to be maintained over a wide temperature range and preferably cooled laser operation is avoided, or at least the degree of temperature control is preferably limited. As a consequence, laser distortion performance may be largely imperfect and cause distortions of signals on AM links worse than −60 to −50 dBc, thereby affecting performance for AM-VSB signals and for complex modulation formats.

Traditionally, electronic distortion compensation is applied in AM transmitters 304 or 322 to eliminate distortion. However for uncooled or poorly controlled lasers, the level of distortion compensation in an AM optics implementation varies with temperature, and extensive tests and alignment procedures are performed to control the distortion compensation electronics. A CCAP solution with pluggable analog optics may perform the compensation function digitally before the DAC that generates the RF signal that drives the laser eliminating the distortion compensation electronics to reduce distortions put out from laser 308 and from receiver 312 and amplifier 314. A fraction of the output of amplifier 314 may be coupled to a filter and provided to return amplifier 320 to monitor distortion content in the output of amplifier 314. As disclosed, the return link consisting of return amplifier 320, return transmitter 322, fiber link 324, receiver 326, amplifier 328 and AD converter 330 is monitored with digital distortion analyzer 332 to obtain information about the performance of the forward link and amplifier, and the obtained information is used to control the digital distortion compensation of the forward transmitter to eliminate distortion content in the output of amplifier 314. Thus a feedback loop is set up that permits continuous control of transmitter performance as temperature varies and as different transmit modules are plugged in without any need for extensive test and alignment of the transmitter when it is manufactured.

The digital pre-distort parameters at 302 may be applied to an RF modulation signal before applying it to the laser 308. The set of pre-distort parameters are produced in advance by the digital distort analyzer 332. The signal, pre-distorted per parameters 302 is provided to a D2A converter 304. The laser 308 is driven by a signal from the D2A converter 304 that has been amplified by amplifier 306. In embodiments, the output signal from the laser 308 is provided to the RF port of the field node 301 via receiver 312, amplifier 314 and a diplexer 318.

A small portion of the signal is tapped off and provided to the return laser path 322 of the field node 301 via a filter 315 that ensures there is no interference with the return spectrum band. At the R-CCAP node 300 the return laser signal is received over the fiber link 324 and AD converted by the analog to digital converter 330 that also converts the return band signals. As shown in FIG. 3, the output from the ADC converter 330 is input to a digital distort analyzer 332 for analysis. The digital distort analyzer device 332 can detect the presence of distortions in the input to AD converter 330. The analysis may include information about unwanted distortions in the forward path and, as described above, the information may be used to control parameters of the pre-distortion process by applying a set of digital pre-distort parameters 302 to the signal provides to the DA converter 304. The filter 315 in the field node can also include a frequency conversion.

Thus, in a forward transmission, the remote node transmits an optical signal to one of the plurality of field nodes. The field node in receipt of the optical signal converts the optical signal to an RF signal and provides a fraction of the RF signal to the reverse transmitter of the field node. Upon receipt of the reverse signal by the remote node, the digital distort analyzer in the remote node monitoring distortions in the remote node and adjusting a distortion compensation to minimize distortion for forward transmissions.

Note that a signal modulated around f_lo or any other frequency can be used to provide a communication path to the field node. Such a communication path can be used to transmit parameters, such as pre-distortion settings (in case the field node has internal pre-distortion controls) or other information such as gain and wavelength settings to mitigate clipping or OBI on the return path.

Figure 4:
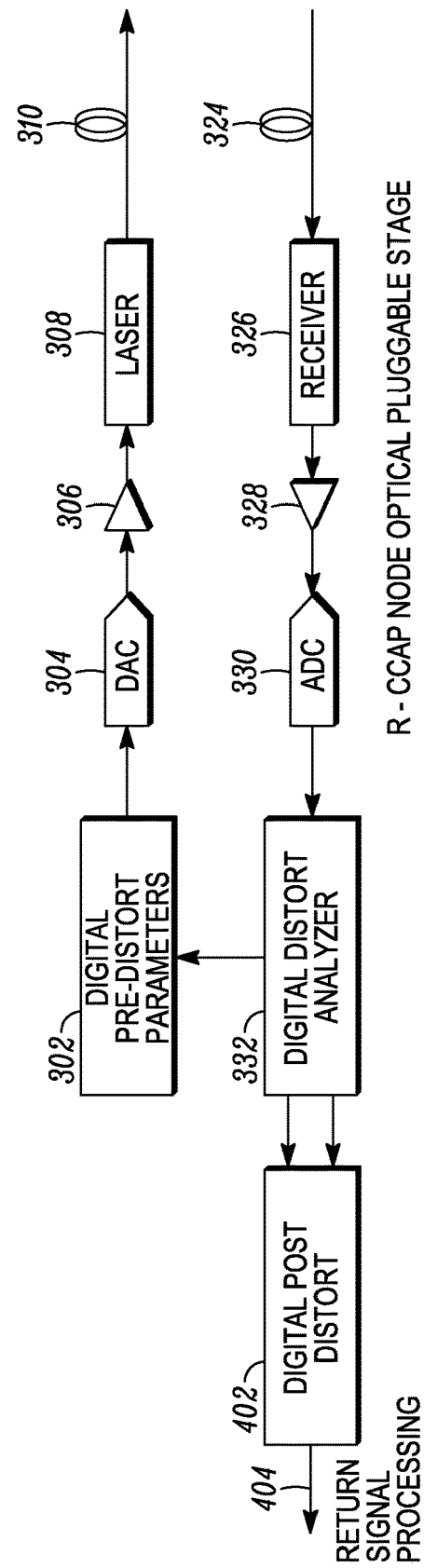
FIG. 4 depicts an embodiment for a distortion signal analyzer that provides parameters and the signal information to a post-distortion correction stage before passing the signal to the return signal processing of the R-CCAP node.

On the return link similar problems apply, however FIG. 3 contemplates an embodiment in which no attempt is needed to improve return transmitter performance. Instead the signals that are received may be sampled by the AD converter 330 and analyzed by the digital distort analyzer 332 to detect distortion in these signals. Then these distortions may be compensated in the digital domain before they are fed to subsequent processing. Thus, in the upstream direction, the digital distort analyzer monitors distortions in a reverse signal received from one of the plurality of field nodes. A modulated tone may be sent to the field node carrying information for the field node to adjust pre-distortion parameters for the reverse transmitter in the field node. However, preferably the digital distort analyzer may correct the signal received to reduce or eliminate distortion in the reverse signal, without controlling the distortion compensation of the reverse transmitter in the respective field node FIG. 4 depicts an embodiment for an R-CCAP node including a distortion signal analyzer 332 that provides parameters and signal information to a post-distortion correction stage at a digital post-distort analyzer 402. The signal may be modified based on the post-distortion correction parameters before passing the signal to the return signal processing 404 (e.g., demodulation etc.) of the R-CCAP node 300.

Figure 5:
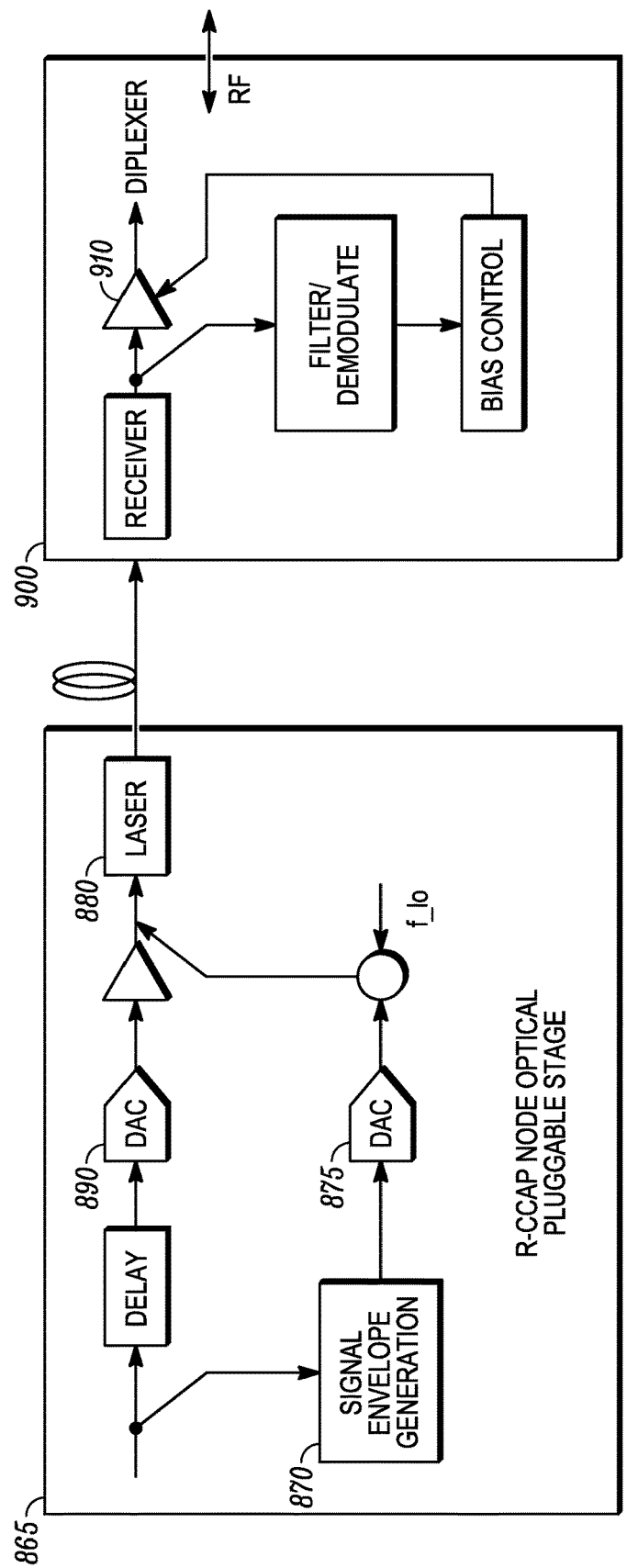
FIG. 5 illustrates an R-CCAP node embodiment with signal envelope prediction for an amplifier in a field node.

FIG. 5 illustrates another embodiment for use with the disclosed techniques for a node optical pluggable driver with signal envelope prediction for the amplifier in the field node. As a part of 'digital forward' effort, some significant signal envelope characteristics and peak to envelope characteristics of a binary sampled typical RF spectrum presented to an HFC system have been performed.

Any DAC driven RF chain can utilize digital signal processing to create a bias current and voltage envelope that permits amplification of high signal peaks while minimizing average power consumption. As disclosed herein, a tone may be modulated with a signal to control amplifier bias and sent on an RF link to subsequent amplifiers. As shown in FIG. 5, such a tone can also be sent via an analog optical link to a subsequent "field node" to control the amplifier in that node and obtain a reduced power dissipation.

FIG. 5 depicts an R-CCAP node optical pluggable driver 800 with signal envelope prediction unit 810 for an amplifier 910 in the field node 900. The signal envelope prediction signal is provided to a D2A converter 820 and up-converted to a carrier frequency f_lo and this signal is added into the signal that is transmitted to the field node 900 by a laser 830. The laser 830 is driven by a delayed signal from a D2A converter 840. In some embodiments, the signal envelope prediction signal may be generated directly by the D2A converter 840 if that DAC has enough bandwidth to generate a signal modulated at frequency f_lo. The field node 900 receives the modulated signal, demodulates that and uses it to dynamically control the bias of the output amplifier 910. Though FIG. 20 illustrates a remote CCAP (R-CCAP) located in a node along a signal path from a headend to one or more subscribers, the CCAP may alternatively be located in the headend, such that a pilot tone may be generated in the headend and transmitted along a signal path concurrently with a delayed signal so that all downstream amplifiers can use the pilot tone to modulate the bias point of the amplifier as the signal is being amplified.

Note that a signal modulated around f_lo or any other frequency can also be used to provide a communication path to the field node. Such a communication path can be used to transmit other parameters information such as gain and wavelength settings to mitigate clipping or OBI on the return path.

Figure 6:
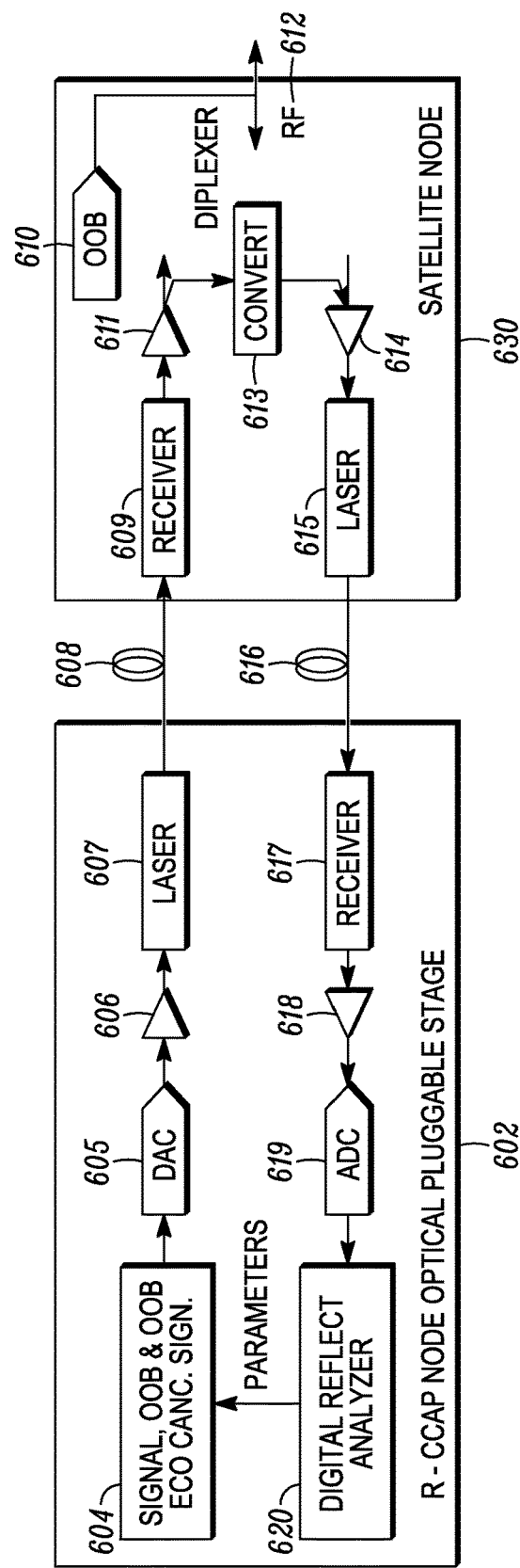
FIG. 6A depicts an example R-CCAP node optical pluggable stage for injecting out of band signals.
FIG. 6B depicts a simplified flowchart of a method for active cancellation of signals according to one embodiment.
Figure 6A:
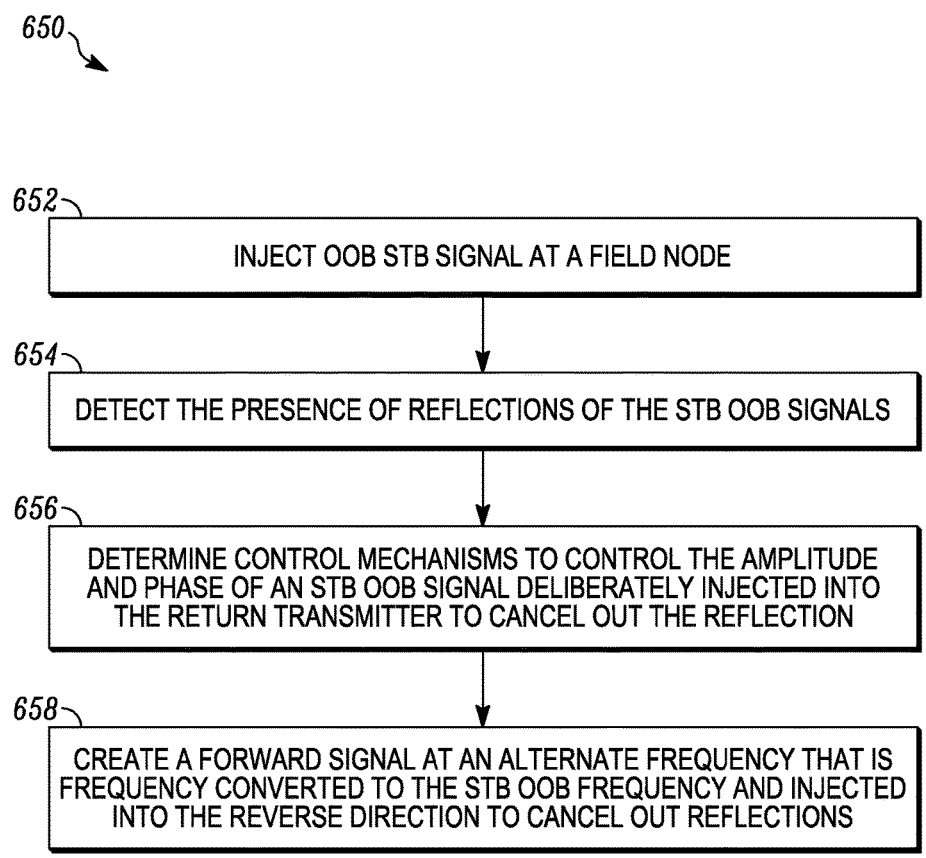

FIG. 6A depicts an example R-CCAP node optical pluggable stage for injecting out of band signals, e.g., STB signals, post the diplexer filter in a field node 630 via a narrowband out of band signal amplifier according to one embodiment. In a node+0 architecture STB OOB signals (e.g. 75 MHz) can be injected in forward direction by an OOB amplifier 610 into an otherwise return spectrum (e.g. 5-200 MHz), thereby injecting the STB OOB signals at an injection point beyond the diplex filter of the node 104. While this can be directional such that the STB OOB signal is put out in the forward direction a reflection of that signal can still end up in the return amplifier 614 and optic components 616, 617, 618, and 619. For a poor reflection, the injection can result in a significant reflected power and detrimentally affect the performance of the return transmitter 615.

A digital reflection analyzer device 620 can detect the presence of reflections of the STB OOB signals. In embodiments, digital reflection analyzer device 620 is found in a remote (R)-CCAP device 602. A R-CCAP device/architecture may be combined with AM optic components, DAC 605, amplifier 606, laser 607, receiver 609, laser 615, and receiver 617, in a star architecture to support STB out of band signals. Digital reflection analyzer device 620 can detect the presence of the STB OOB signals and control mechanisms to suppress the reflections. For example, described above with respect to FIGS. 3-5 are control mechanisms to suppress the reflections using echo cancellation with STB OOB signals. In embodiments, the control mechanisms control the amplitude and phase of an STB OOB signal deliberately injected into the return transmitter 615 to cancel out the reflection. In embodiments, an OOB signal transmitter 604 creates a forward signal at an alternate frequency that is frequency converted to the STB OOB frequency and injected into the reverse direction to cancel out reflections.

In an example embodiment, the signal is injected at a test point of the field node that provides a path to inject a signal, albeit at a high loss. Because the STB OOB signal is narrowband and relatively low power, this loss may be acceptable. Further, the main path loss is not affected if the existing tap for the test point is used. The R-CCAP node 602 can include digital reflection analyzer device 620 to detect reflections of the STB OOB signal. If the reflections are severe, then a reflection cancellation signal can be generated by OOB signal transmitter 604 based on parameters from digital reflection analyzer device 620, and sent to the field node 630 modulated on another frequency. Field node 630 receives this signal, converts the signal back to the OOB signal frequency range via a converter 613, and feeds the reflection cancellation signal into the reverse path at amplifier 614 and/or laser 615 to cancel it.

Note that the OOB signal itself may also be modulated onto another frequency such that the OOB amplifier 610 performs the conversion to the STB OOB target frequency. In that case the cancellation signal could be generated without further need for conversion at field node 630. Where the STB OOB signal is not needed the narrowband OOB signal amplifier and/or echo cancellation converter need not be installed, so this can be an optional plug-in module.

Figure 6B:
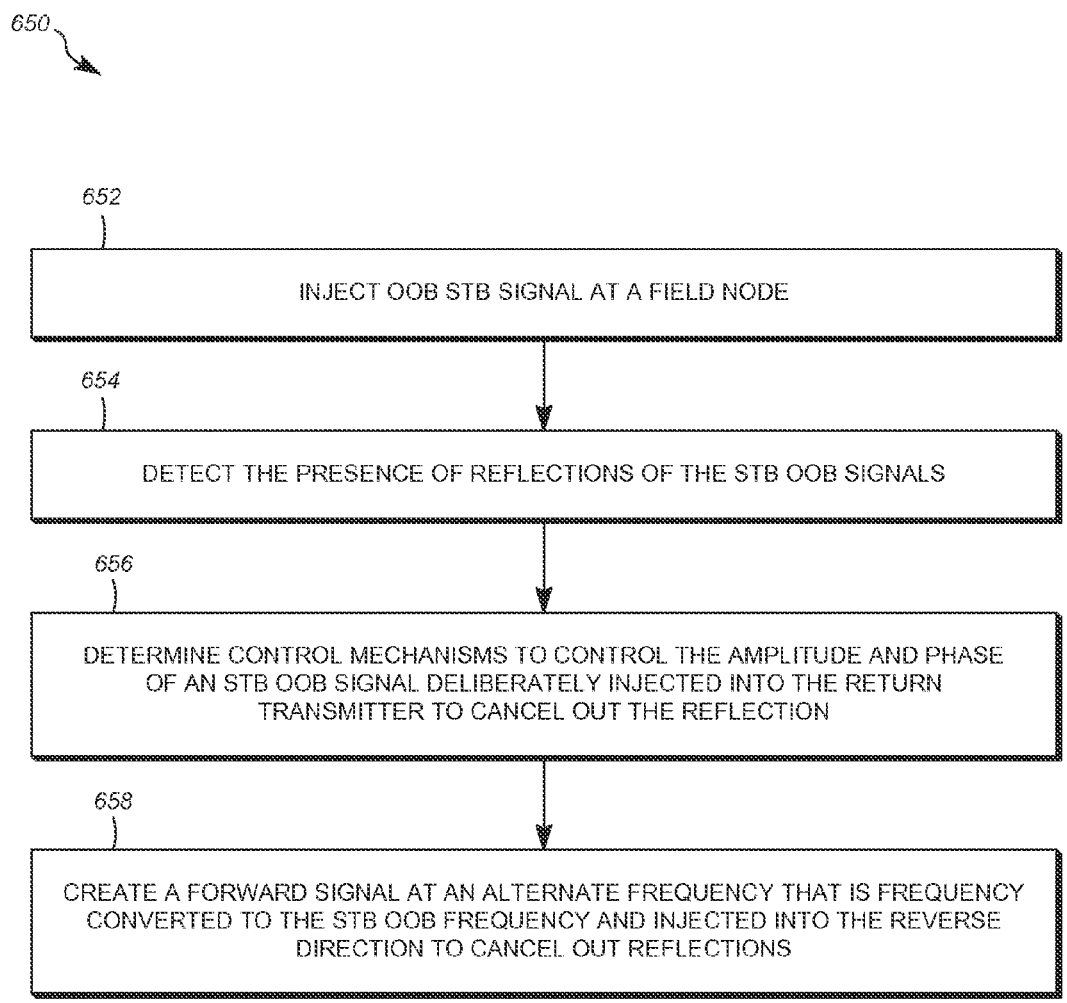

FIG. 6B depicts a simplified flowchart 650 of a method for active cancellation of signals according to one embodiment. At 652, an STB signal 200 is injected at a field node 630, such as by a OOB amplifier 610. This signal is intended to be sent in the return band. At 654, digital reflection analyzer device 620 detects the presence of reflections of the STB OOB signals. At 656, digital reflection analyzer device 620 determines control mechanisms to control the amplitude and phase of an STB OOB signal deliberately injected into the return transmitter 615 to cancel out the reflection. At 658, OOB signal transmitter 604 creates a forward signal at an alternate frequency that is frequency converted to the STB OOB frequency and injected into the reverse direction to cancel out reflections.

Figure 7:
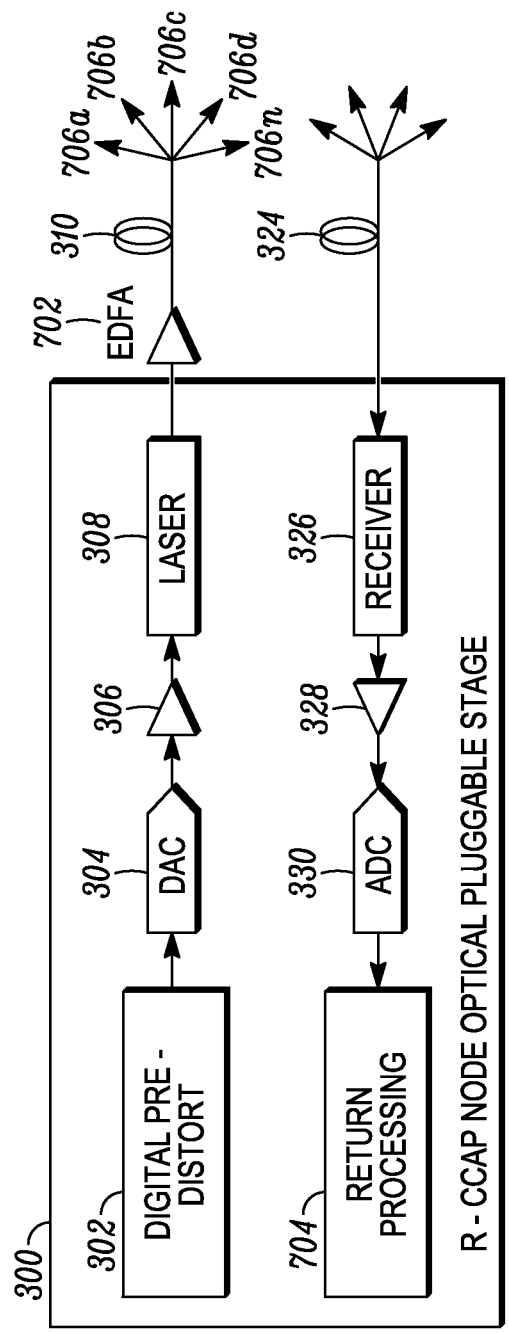
FIG. 7 depicts an embodiment for an R-CCAP node operating as an RFoG system.

FIG. 7 depicts an embodiment using an R-CCAP node optical pluggable stage for migration to RFoG. In embodiments, analog plug-gables operated in the 1550 nm region can be amplified with an EDFA (702); however, instead of receiving these signals and converting them to RF they can also be amplified and sent direct to subscribers connected to fibers 706(*a*) . . . (*n*). Thus, an R-CCAP architecture with analog plug-gables to the field nodes 205*a-n* can be readily converted to an RFoG system. As the R-CCAP system serves small subscriber groups per optical port, issues such as OBI can readily be mitigated with one or more of known techniques. On the short links 706*a*, 706*b*, the RFoG bandwidth can be further increased to 20 Gbs and 40 Gbs for handling expected increases in channel traffic.

FIG. 7 depicts the same R-CCAP node described above operating as an RFoG system with 20-40 Gbs forward BW per SG. Many R-PHY and R-CCAP architectures relaying of 10 Gbs signals is assumed via switches. This implies 10 Gbs optics for each field node and DACs in each one of them. In embodiments, R-PHY architectures may be chosen instead of R-CCAP at the expense of transparency and interoperability issues. In embodiments disclosed herein, much lower cost analog optics may be used to perform the function of digital optics. If requirements on the analog optics are kept low (e.g., by using digital processing as discussed) such transmitters will retain a cost point below that of 10-20 Gbs digital optics. Analog receivers are generally lower cost than digital receivers and subsequent processing. The field nodes will likely be of much lower cost than the R-CCAP or R-PHY nodes.

In embodiments where passive optical switching (instead of relaying) data is used to serve multiple nodes per transmitter, the number of transmitters may be lower. However, the relatively expensive digital receivers and processing remain. Analog may prevail for short links, but where service aggregation is significant, digital solutions may function more effectively.

In one or more examples, the functions disclosed herein may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses. Various components, modules, or units are described in this disclosure to emphasize functional aspects of components configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A system including a cable network headend or hub that extends to a remote node having physical layer (PHY)

functionality and linked in a star architecture over short range fiber links between the remote node and a plurality of field nodes that are not converted for PHY functionality, the system comprising:

the remote PHY node that performs modulation including:
an input for receiving digital transmissions from the cable network headend or hub,
remote PHY functionality, including a digital to analog converter for converting the digital transmissions from digital to analog and an analog to digital converter for converting traffic received from at least one field node from analog to digital traffic;
an amplifier driving a forward transmitter that communicates to a receiver in one or more of the plurality of field nodes;
the forward transmitter for transmitting a converted signal to at least one field node in the star architecture over a respective short range fiber link;
a return transmitter for aggregating digital converted traffic from a plurality of field nodes for transmitting upstream to the cable headend or hub; and
the plurality of field nodes that are each connected via at least one short range fiber link to the remote PHY node to form the star architecture, the plurality of field nodes without PHY complexity, each comprising:
a radio frequency (RF) output for transmitting converted analog signals downstream over coax;
a reverse transmitter for transmitting analog inputs from the RF output to the remote node,
wherein the plurality of field nodes utilize the at least one or more short range fiber links for transmitting analog forward and analog return traffic between the remote PHY node and each field node.

2. The system of claim 1, wherein transmissions from the cable headend are routed to the plurality of field nodes via the remote node, wherein the remote node is a single remote node that communicates with the plurality of field nodes.

3. The system of claim 1, wherein the star architecture comprises the remote node combined with amplitude modulation optics for addition of additional nodes.

4. The system of claim 1, the remote node further comprising:
a digital distortion analyzer, wherein in a forward transmission:
the remote node transmits an optical signal to one of the plurality of field nodes,
the field node in receipt of the optical signal converts the optical signal to an RF signal and provides a fraction of the RF signal to the reverse transmitter of the field node, and
upon receipt of a reverse signal by the remote node, the digital distortion analyzer in the remote node is monitoring distortions in the remote node and adjusting a distortion compensation to minimize distortion for forward transmissions.

5. The system of claim 1, the remote node further comprising a digital distortion analyzer, wherein in an upstream transmission, the digital distortion analyzer monitors distortions in a reverse signal received from one of the plurality of field nodes, and corrects the signal received to reduce or eliminate distortion in the reverse signal without controlling distortion compensation of the reverse transmitter in the one of the plurality of field nodes.

6. The system of claim 1, wherein the remote node has a transparent Ethernet layer.

7. The system of claim 1, wherein the remote node uses a transparent RF layer as the output.

8. The system of claim 1, wherein analog optics in the remote node bypass or eliminate RF processing in the cable headend.

9. The system of claim 1, wherein at least one field node is split from the remote node.

10. The system of claim 1, wherein the plurality of field nodes are located in close proximity to the remote node, and are connected via a fiber.

11. The system of claim 9, wherein the field node split from the remote node is placed in a geographic location in close proximity to the remote node for connection via a short-range fiber link.

12. The system of claim 1, wherein a respective wavelength is implemented between each of the fiber links connecting the remote node to a respective one of the plurality of field nodes.

13. The system of claim 1, wherein the remote node is at least one of a Remote Converged Cable Access Platform (CCAP) node or a Remote physical layer (PHY) node.

14. The system of claim 1, wherein the remote node:
performs a reflection analysis on signals encoded at the analog to digital converter to determine if the signal received at the analog to digital converter contains a reflection that is both known to the remote node and sent in the downstream direction from the field node in the upstream frequency band, and
generates, based on the reflection analysis, an additional signal for transmission to the field node for conversion and combination at the field node with the signal received at the analog to digital converter to the reverse transmitter to cancel reflections.

15. The system of claim 1, wherein a feedback loop is set up that permits continuous control of at least one of the reverse transmitter or the forward transmitter performance as temperature varies.

16. A node remote from a hub or from a cable headend, the remote node having physical layer (PHY) functionality and linked in a star architecture over short range fiber links between the remote node and a plurality of field nodes that are not converted for PHY functionality, the remote node comprising:
an input for receiving digital transmissions from a network headend;
remote PHY functionality, including a digital to analog converter for converting the digital transmissions from digital to analog and an analog to digital converter for converting traffic received from at least one field node from analog to digital traffic;
an amplifier driving a forward transmitter that communicates to a receiver in one or more of the plurality of field nodes;
the forward transmitter for transmitting a converted signal to at least one field node in the star architecture over a respective short range fiber link;
a return transmitter for aggregating digital converted traffic from the plurality of field nodes for transmitting upstream to the cable headend;
a plurality of short range fiber links connecting the remote node to at least one respective field node in the plurality of field nodes to form a star architecture, wherein the remote PHY node and the plurality of field nodes that are not converted for PHY functionality exchange analog traffic over the plurality of short range fiber links, and wherein transmissions from the cable headend are routed through the single remote node to the plurality of field nodes and additional nodes due to node splitting of the field nodes.

17. The remote node of claim 16, wherein the field nodes split from the remote node remain in close proximity to the remote node and are connected via a fiber.

18. The remote node of claim 16, the remote node further comprising a digital distortion analyzer, wherein in a forward transmission:
- the remote node transmits an optical signal to one of the plurality of field nodes,
- the field node in receipt of the optical signal converts the optical signal to an RF signal and provides a fraction of the radio frequency (RF) signal to a reverse transmitter of the field node, and
- upon receipt of a reverse signal by the remote node from the reverse transmitter, the digital distortion analyzer in the remote node monitoring distortions in the remote node and adjusting a distortion compensation to minimize distortion for forward transmissions.

19. The remote node of claim 18, wherein a resulting feedback loop permits continuous control of the remote node forward transmitter performance as temperature varies.

20. The remote node of claim 18, wherein each of the plurality of field nodes are located at a subscriber premises and active or passive optical splitters connect the remote node to the plurality of field nodes.

* * * * *